(12) United States Patent
Sugano et al.

(10) Patent No.: US 8,147,343 B2
(45) Date of Patent: Apr. 3, 2012

(54) TAP

(75) Inventors: Hiroto Sugano, Toyokawa (JP); Seiji Ohhashi, Toyokawa (JP)

(73) Assignee: OSG Corporation, Aichi (JP)

( * ) Notice: Subject to any disclaimer, the term of this patent is extended or adjusted under 35 U.S.C. 154(b) by 189 days.

(21) Appl. No.: 11/918,560

(22) PCT Filed: Nov. 30, 2006

(86) PCT No.: PCT/JP2006/324030
§ 371 (c)(1),
(2), (4) Date: Jan. 14, 2008

(87) PCT Pub. No.: WO2008/068816
PCT Pub. Date: Jun. 12, 2008

(65) Prior Publication Data
US 2009/0291767 A1 Nov. 26, 2009

(51) Int. Cl.
*B21J 13/02* (2006.01)
(52) U.S. Cl. .............. 470/198; 408/67; 408/222
(58) Field of Classification Search .......... 470/198; 408/67, 222; 409/137
See application file for complete search history.

(56) References Cited

U.S. PATENT DOCUMENTS

| 5,842,924 | A | * | 12/1998 | Manos et al. ............ 470/198 |
| 5,947,661 | A | * | 9/1999 | Sugata ................ 409/131 |
| 2004/0131434 | A1 | | 7/2004 | Giessler | |

FOREIGN PATENT DOCUMENTS

| JP | S55-58920 | 5/1980 |
| JP | S61-136725 | 6/1986 |
| JP | H05-49216 | 6/1993 |
| JP | H11-333630 | 12/1999 |

* cited by examiner

*Primary Examiner* — Edward Tolan
*Assistant Examiner* — Matthew G Katcoff
(74) *Attorney, Agent, or Firm* — Muramatsu & Associates (57) ABSTRACT

A tap is designed so that the pollution of the environment can be prevented and the cleaning can be simplified. The tap includes an intake hole having openings at a screw portion of the tap. Air intake is performed through the intake hole, so that the chips generated by the screw portion in the cutting can be aspirated from the openings forcibly. Because the chips can be discharged without using cutting fluids, pollution of the environment can be prevented. Because the chips can be aspirated from the openings and discharged from the intake hole of the tap, the chips are not scattered on the work piece, and thus a cleaning process of the work piece can be simplified.

4 Claims, 6 Drawing Sheets

| DIAMETER OF INTAKE HOLE (mm) | ASPIRATION RATIO FOR CHIPS (%) | CHIP DISCHARGE CAPABILITY |
|---|---|---|
| 2 | 0 | POOR |
| 2.5 | 0 | POOR |
| 3 | 0 | POOR |
| 3.5 | 0 | POOR |
| 4 | 100 | EXCELLENT |
| 4.5 (PRESENT INVENTION) | 100 | EXCELLENT |
| 5 | 100 | EXCELLENT |
| 5.5 | – | – (BROKEN) |
| 6 | – | – (BROKEN) |

TAP

TECHNICAL FIELD

The present invention relates to a tap, in particular, to a tap in which chips are aspirated and discharged forcibly to prevent pollution of the environment and to simplify cleaning.

BACKGROUND ART

Generally, in cutting, a cutting fluid is used for discharging chips generated in the cutting. For example, Japanese Patent Application Laid-Open Publication No. H11-333630 discloses a tap having, inside its body, an oil hole through which the cutting fluid flows, and a branch hole communicating with the oil hole. A top portion of the branch hole is open inside a chip discharging groove.

In this tap, the cutting fluid which has flown through the oil hole is delivered from the branch hole to the chip discharge groove, and discharged along the chip discharge groove. Accordingly, the chips can be discharged from the chip discharge groove together with the cutting fluid.

As a tap in which chips can be discharged without using the cutting fluid, a deep hole tap having a vertical hole inside its body and a lateral hole communicating with the vertical hole is known. A top portion of the lateral hole is open to an outer peripheral surface of the body.

In this deep hole tap, the chips which have entered the vertical hole are gradually pushed up by newly generated chips, and the body rotates, so that the chips which have flown through the vertical hole can be discharged from the lateral hole.

DISCLOSURE OF THE INVENTION

Problems to be Solved by the Invention

However, because the cutting fluid usually includes a toxic substance such as chlorine and phosphorus, the cutting fluid disadvantageously causes pollution of the environment when the cutting fluid is used.

When the above deep hole is used, the chips are discharged by only the rotation force of the body, so that the discharged chips scatter on a work piece, disadvantageously causes complicating the cleaning.

The present invention is made for solving the above problems. An object of the present invention is to provide a tap in which chips are aspirated and discharged forcibly without using cutting fluids so that the pollution of the environment can be prevented and the cleaning can be simplified.

Means for Solving the Problem

For achieving the object, a tap in the first aspect of the present invention includes a screw portion having a chamfer angle portion and a complete thread portion provided next to the chamfer angle portion, a body provided next to the screw portion, and a groove recessed on an outer peripheral surface of the screw portion, the tap rotating about a center axis to cut a female screw on a work piece, the tap comprising: an intake hole extending inside the body from a rear end surface of the body to the screw portion, where the intake hole has a circular cross section with a diameter smaller than a diameter of the body and larger than a groove bottom diameter of the grooves, and has an opening which opens to an outside at the grooves; and chips generated in the cutting are aspirated from the opening by performing air intake through the intake hole.

According to the tap in the second aspect of the present invention, in addition to the first aspect noted above, the diameter of the intake hole is sixty-five percent or under of the diameter of the body.

According to the tap in the third aspect of the present invention, in addition to the first or second aspect noted above, an end portion of the opening at a top side of the screw portion is positioned in a range of the chamfer angle portion, and an end portion of the opening at a rear side of the screw portion positioned closer to the top side of the screw portion than to a position corresponding to a tenth thread of the complete thread portion.

According the tap in the fourth aspect of the present invention, in addition to the above noted aspects, the groove extends at least into the range of the chamfer angle portion, and an extending length of the groove is shorter than a length corresponding to the range of the screw portion.

In the fifth aspect of the present invention, a tap includes a screw portion having a chamfer angle portion and a complete thread portion provided next to the chamfer angle portion, a body provided next to the screw portion, and a groove recessed on an outer peripheral surface of the screw portion, the tap rotating about a center axis to cut a female screw on a work piece, the tap comprising: a projection extended from a top surface of the screw portion; and an intake hole extending inside the body from a rear end surface of the body at least to a top of the screw portion, where the intake hole has a circular cross section with a diameter smaller than a diameter of the body and larger than a groove bottom diameter of the groove, and has an opening which opens to an outside at the groove; and chips generated in cutting are aspirated from the opening by performing air intake through the intake hole.

According to the tap in the sixth aspect of the present invention, in addition to the fifth aspect noted above, the diameter of the intake hole is sixty-five percent or under of the diameter of the body.

According to the tap in the seventh aspect of the present invention, in addition to the fifth and sixth aspects noted above, an end portion of the opening at a top side of the screw portion is positioned at the projection, and an end portion of the opening at a rear side of the screw portion positioned closer to the top side of the screw portion than to a position corresponding to a tenth thread of the complete thread portion.

According to the tap in the seventh aspect of the present invention, in addition to the fifth to seventh aspects noted above, the groove extends at least into a range of the chamfer angle portion, and an extending length of the groove is shorter than a length corresponding to the range of the screw portion.

Effects of the Invention

In the tap of the first aspect of the present invention, because the intake hole having openings is provided, air intake is performed there through. Accordingly, chips generated in cutting can be aspirated from the openings forcibly.

As a result, because the chips can be discharged without using the cutting fluid, the pollution of the environment can be advantageously prevented. Further, because the cutting fluid is not used, a cost of the cutting can be advantageously reduced.

Additionally, because the chips can be aspirated from the openings forcibly, and the chips aspirated from the openings can be discharged from the intake hole, the chips are not scattered on the work piece, and thus cleaning can be advantageously simplified.

Further, because the chips are aspirated from the openings forcibly, the intake hole is hardly filled with the chips in comparison with the case where the discharge is gradually done by newly generated chips without force. Accordingly, the chip discharge capability can be advantageously improved.

Additionally, because the openings are open at the grooves, and the chips are aspirated from the openings, a containing space of each of the grooves for containing the chips, such as a length, width, or groove bottom depth of the grooves, can be reduced. As a result, because the tool rigidity can be secured, the tool life can be advantageously increased.

Because the intake hole extends from the rear end surface of the body, the constitution for discharging the chips can be advantageously simplified.

In the tap of the second aspect of the present invention, in addition to the advantage of the tap of the first aspect noted above, the diameter of the intake hole is sixty-five percent or under of the diameter of the body, the tool rigidity can be secured.

In other words, when the diameter of the intake hole is over sixty-five percent of the body, the wall thickness of the body becomes thin, decreasing the tool rigidity. In contrast, the diameter of the intake hole is sixty-five percent or under of the diameter of the body, so that the tool rigidity can be secured. Accordingly, the tool life can be advantageously increased.

In the tap of the third aspect of the present invention, in addition to the advantage of the tap of the first or second aspect noted above, because the end portion of each of the openings at the top side of the screw portion is positioned in the range of the chamfer angle portion, the chip aspiration capability can be improved.

In other words, when the end portion of each of the openings at the top side of the screw portion is positioned at the top of the screw portion, namely when the intake hole penetrates the screw portion, sufficient negative pressure cannot be obtained, decreasing the aspirating force in the intake. As a result, the chip aspiration capability decreases.

On the other hand, when the end portion of each of the openings at the top side of the screw portion is not positioned in the range of the chamfer angle portion, namely when the end portion is positioned at the complete thread portion, the openings cannot be established corresponding to the range of the chamfer angle portion. Accordingly, the chip aspiration capability decreases.

In contrast, the end portion of each of the openings at the top side of the screw portion is positioned within the range of the chamfer angle portion, so that the decrease of the aspiration force can be prevented, and the chips generated at the chamfer angle portion can be aspirated within the range of the chamfer angle portion. Accordingly, the chip aspiration capability can be advantageously improved.

The end portion of each of the openings at the rear side of the screw portion is positioned closer to the top side of the screw portion than to the position corresponding to the tenth thread of the complete thread portion, so that the chip aspiration capability can be improved.

In other words, when the end portion of each of the openings at the rear side of the screw portion is positioned closer to the rear side of the screw portion than to the position corresponding to the tenth thread of the complete thread portion, the area of the openings becomes large. Accordingly, because sufficient negative pressure cannot be obtained at the openings, the aspiration force in the intake decreases. As a result, the chip aspiration capability decreases.

In contrast, the end portion of each of the openings at the rear side of the screw portion, is positioned closer to the top side of the screw portion than to the position corresponding to the tenth thread of the complete thread portion, so that the decrease of the aspiration force can be prevented. Accordingly, the chip aspiration capability can be advantageously improved.

Further, because no chip is generated at the complete thread portion, the end of each of the openings at the rear side of the screw portion is positioned closer to the top side of the screw portion than to the position corresponding to the tenth thread of the complete thread portion. Accordingly, the tool rigidity can be secured without decreasing the chip aspiration capability. As a result, the tool life can be advantageously improved.

In the tap of the fourth aspect of the present invention, in addition to the advantage of the tap of any one of the first to third aspects noted above, because the grooves extend at least into the range of the chamfer angle portion, the chips generated at the chamfer angle portion can be contained in the full range of the chamfer angle portion. Accordingly, the chip containing capability can be improved, and thus the chip aspiration capability can be improved.

Additionally, because the extending length of the grooves are shorter than the length corresponding to the range of the screw portion, the tool rigidity can be secured without decreasing the chip aspiration capability. As a result, the tool life can be advantageously improved.

In the tap of the fifth aspect of the present invention, the intake hole having the openings is provided so that the chips generated from the openings in cutting can be aspirated forcibly when the air intake is performed through the intake hole.

Accordingly, because the chips can be discharged forcibly without using the cutting fluid, the pollution of the environment can be advantageously prevented. Further, because the cutting fluid is not used, the cost for the cutting can be advantageously reduced.

Additionally, because the chips can be aspirated from the openings forcibly, and the chips aspirated from the openings can be discharged through the intake hole, the chips are not scattered on the work piece, and thus the cleaning can be advantageously simplified.

Additionally, because the openings are open at the grooves, and the chips are aspirated from the openings, the containing space of the grooves for containing the chips, such as the length of the grooves, the width of the grooves, or the groove bottom depth of the grooves, can be reduced. As a result, because the tool rigidity can be secured, the tool life can be advantageously improved.

Additionally, because the intake hole extends from the rear end surface of the body, the constitution for discharging the chips can be advantageously simplified.

Additionally, because the projection is provided, the intake hole can extend at least to the top of the screw portion without penetration. Additionally, because the intake hole extends at least to the top of the screw portion, the openings can be provided corresponding to the full range of the chamfer angle portion.

Accordingly, because the chips generated at the chamfer angle portion can be aspirated in the full range of the chamfer angle portion, the chip aspiration capability can be advantageously improved.

In the tap of the sixth aspect of the present invention, in addition to the advantage of the fifth aspect noted above, because the diameter of the intake hole is sixty-five percent or under of the diameter of the body, the tool rigidity can be secured.

In other words, when the diameter of the intake hole is over sixty-five percent of the diameter of the body, the wall thickness of the body is thinned, decreasing the tool rigidity. In contrast, because the tool rigidity can be secured when the diameter of the intake hole is sixty-five percent or under of the diameter of the body, the tool life can be advantageously improved.

In the tap of the seventh aspect of the present invention, in addition to the advantage of the fifth or seventh and second aspect noted above, the end portion of each of the openings, the end portion being on the top side of the screw portion, is positioned at the projection, so that the chip aspiration capability can be improved.

In other words, when the end portion of each of the openings at the top side of the screw portion is not positioned at the projection, namely, the end portion is positioned at the screw portion, the openings cannot be established corresponding to the full range of the chamfer angle portion, decreasing the chip aspiration capability.

In contrast, the end portion of each of the openings at the top side of the screw portion is positioned at the projection, so that the chips generated at the chamfer angle portion can be aspirated in the full range of the chamfer angle portion. Accordingly, the chip aspiration capability can be advantageously improved.

Additionally, because the end portion of each of the openings at the rear side of the screw portion is positioned closer to the top side of the screw portion than to the position corresponding to the tenth thread of the complete thread portion, the chip aspiration capability can be improved.

In other words, when the end portion of each of the openings at the rear side of the screw portion is positioned closer to the rear side of the screw portion than to the position corresponding to the tenth thread of the complete thread portion, the opening area of the openings becomes large, and thus sufficient negative pressure cannot be obtained. Accordingly, the aspiration force decreases in the intake. As a result, the chip aspiration capability decreases.

In contrast, the end portion of each of the openings at the rear side of the screw portion is positioned closer to the top side of the screw portion than to the position corresponding to the tenth thread of the complete thread portion, so that the decrease of the aspiration force can be suppressed, and thus the chip aspiration capability can be improved.

Further, because no chip is generated at the complete thread portion, the end portion of each of the openings at the rear side of the screw portion is positioned closer to the top side of the screw portion than to the position corresponding to the tenth thread of the complete thread portion, so that the tool rigidity can be secured without decreasing the chip aspiration capability. As a result, the tool life can be advantageously improved.

In the tap of the seventh aspect of the present invention, in addition to the advantage of the tap of any one of the fifth to seventh aspects noted above, because the grooves extend at least into the range of the chamfer angle portion, the chips generated at the chamfer angle portion can be contained in the full range of the chamfer angle portion. Accordingly, the chip containing capability can be improved, and thus the chip aspiration capability can be advantageously improved.

Further, because the extending length of the grooves is made shorter than the length corresponding to the range of the screw portion, the tool rigidity can be secured without decreasing the chip aspiration capability. As a result, the tool rigidity can be advantageously improved.

EXPLANATION OF REFERENCE NUMERALS AND SYMBOLS

1 . . . tap
2 . . . body
3 . . . screw portion
3a . . . chamfer angle portion
3b . . . complete thread portion
4 . . . groove
5 . . . intake hole
5a . . . opening
106 . . . projection
Db . . . diameter of a body
Dg . . . groove bottom diameter of groove
Dh . . . diameter of an intake hole
O . . . center axis
Ps . . . end portion of opening, the end portion being on a top side of a screw portion
Pe . . . end portion of opening, the end portion being on a rear side of a screw portion

BEST MODE FOR CARRYING OUT THE INVENTION

Figure 1:
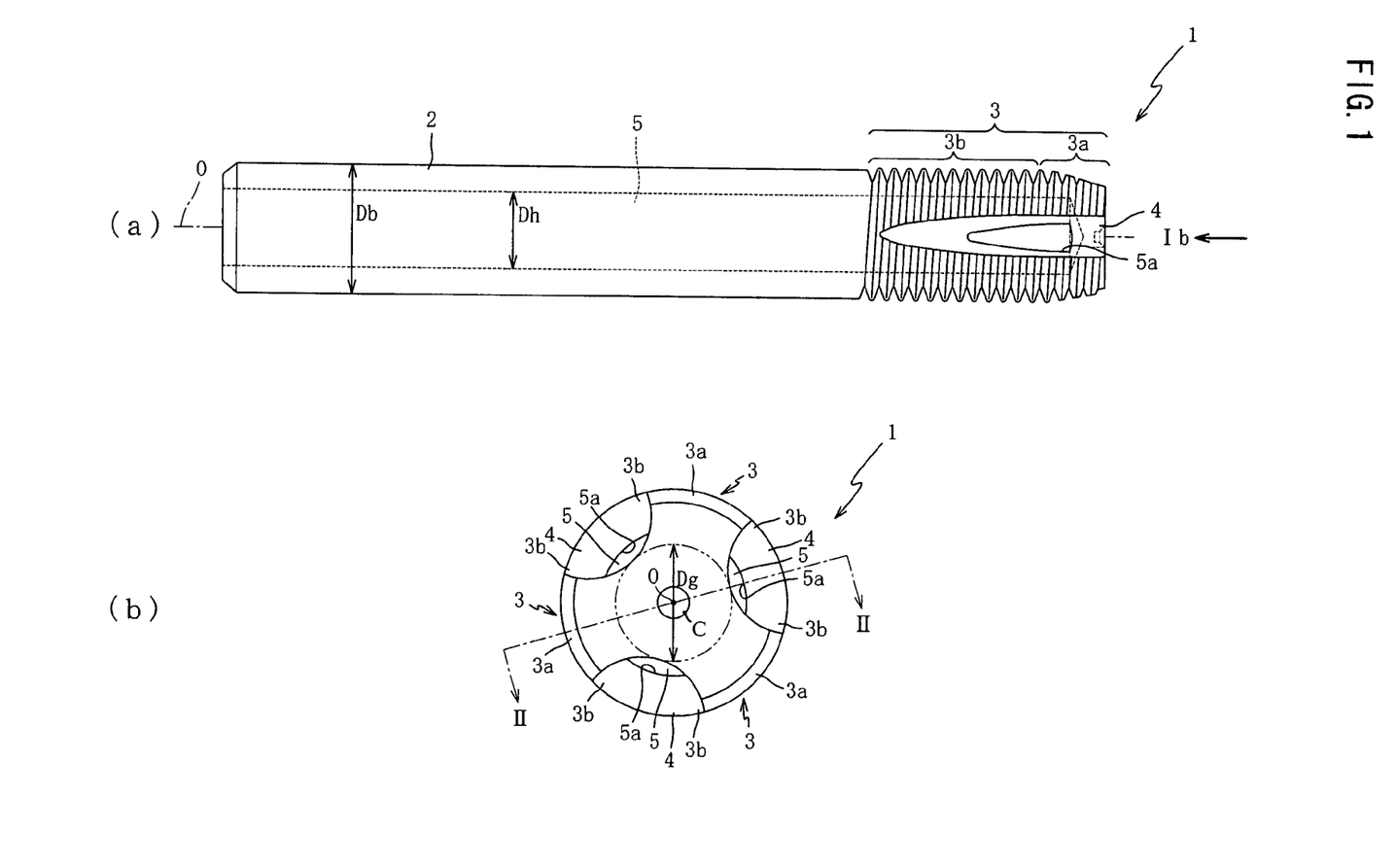
FIG. 1(a) is a front view of a tap in a first embodiment of the present invention.
FIG. 1(b) is a side view of the tap viewed from the direction of an arrow Ib of FIG. 1(a).

Preferred embodiments of the present invention is explained below in reference to the appended drawings. First, in reference to FIG. 1, a tap 1 in a first embodiment of the present invention is explained. FIG. 1(a) is a front view of the tap 1. FIG. 1(b) is a side view of the tap 1 viewed from the direction of an arrow Ib of FIG. 1(a).

The tap 1 is a tool for cutting a female screw in a pilot hole (not shown) of a work piece by use of a rotation force transmitted from a tooling machine (not shown). As shown in FIG. 1, the tap 1 is a solid type constituted of cemented carbide which is made by pressing and sintering, e.g., tungsten carbide (WC), and includes a body 2 and a screw portion 3 provided next to the body 2. However, the tap 1 may be constituted of high-speed steel, as well as cemented carbide.

The body 2 is a portion held by a holder 10 (see FIG. 3), and as shown in FIG. 1, formed as a cylindrical shape having a center axis O. In this embodiment, a diameter Db of the body 2 is 8 mm.

The screw portion 3 is a portion rotating for the cutting by the rotation force transmitted from the tooling machine via the body 2. As shown in FIG. 1, the screw portion 3 includes a chamfer angle portion 3a and a complete thread portion 3b provided next to the chamfer angle portion 3a. Three grooves 4 are formed on an outer peripheral surface of the screw portion 3 substantially parallel to the center axis O of the body 2.

The chamfer angle portion 3a is a portion for cutting a female screw by cutting a pilot hole of the work piece. As shown in FIG. 1(a), the chamfer angle portion 3a is tapered, where the external diameter becomes smaller toward a top side (the right side of FIG. 1(a)) of the screw portion 3. In this embodiment, the number of threads of the chamfer angle portion 3a is five.

The complete thread portion 3b is a portion for finishing the female screw cut by the chamfer angle portion 3a, and has the substantially same shape as the female screw to be formed in the pilot hole of the work piece. In this embodiment, the number of threads of the complete thread portion 3b is twelve.

The grooves 4 are portions for containing chips generated at the chamfer angle portion 3a. As shown in FIG. 1, the grooves 4 are formed substantially linearly, and extend from the top surface (the right side of FIG. 1(a)) of the screw portion 3 to a position corresponding to the eleventh thread of the complete thread portion 3b.

The grooves 4 are formed by rotating a disk-shaped grindstone and moving the grindstone from the top side of the screw portion 3 to the rear side (the left side of FIG. 1(a)) of the screw portion 3 parallel to the direction of the center axis O of the body 2. Accordingly, the grooves 4 are formed to have groove bottoms which are substantially parallel to the center axis O of the body 2 on the top side of the screw portion 3, and which ascend corresponding to the shape of the grindstone on the rear side of the screw portion 3. As a result, the groove bottom diameter becomes larger toward the rear side of the screw portion 3 (see FIG. 2). In this embodiment, a groove bottom diameter Dg of the grooves 4 is 3.52 mm on the top side of the screw portion 3, the grooves 4 being formed substantially parallel to the center axis O of the body 2 on the top side of the screw portion 3.

As shown in FIG. 1, inside the tap 1, an intake hole 5 extends from the rear end surface of the body 2 (the left side of FIG. 1(a)) to a position corresponding to the second thread of the chamfer angle portion 3a along the center axis O.

As explained later, the intake hole 5 is a portion where air intake is performed in the cutting, has a circular cross section, and has a diameter Dh smaller than the diameter Db of the body 2 and larger than the groove bottom diameter Dg of the grooves 4. In this embodiment, the diameter Dh of the intake hole 5 is 4.5 mm.

The diameter Dh of the intake hole 5 is smaller than the diameter Db of the body 2 and larger than the groove bottom diameter Dg of the grooves 4, so that openings 5a which open to the outside in the grooves 4 are provided to the intake hole 5, as shown in FIG. 1.

Figure 2:
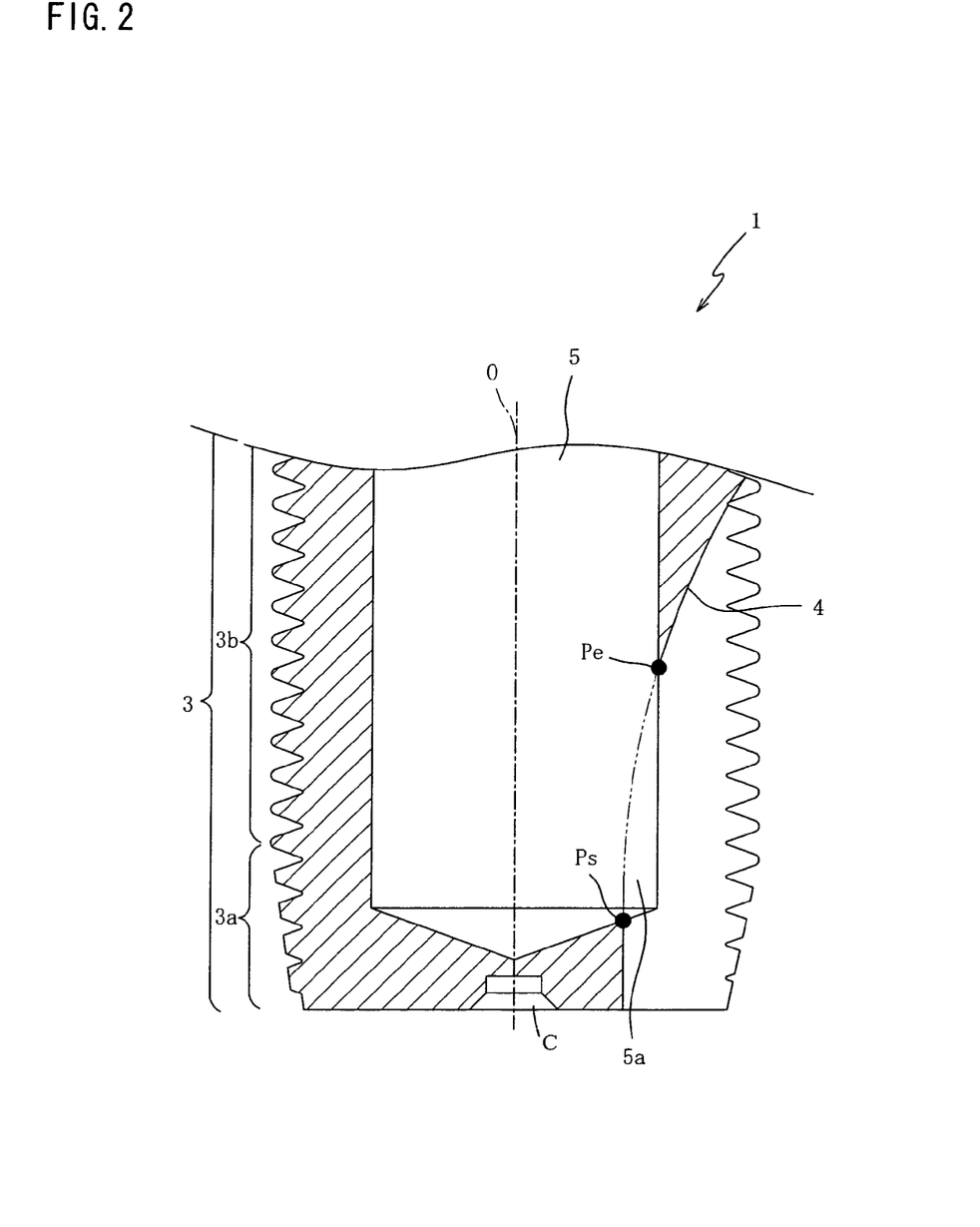
FIG. 2 is a cross sectional view of the tap taken along a line II-II of FIG. 1(b).

In reference to FIG. 2, a detailed constitution of the openings 5a is explained. FIG. 2 is a cross section of the tap 1 taken along the line II-II of FIG. 1(b). In FIG. 2, the length in the direction of the center axis O of the body 2 is omitted. A center hole C formed about the axis O on an end surface of the screw portion 3 is shown at a lower end of FIG. 2. As is well known in the art, the center hole C is formed on an end of the tap for supporting the tap by tools during a machining process.

Each opening 5a is a portion for aspirating chips generated at the chamfer angle portion 3a when the air intake is performed via the intake hole 5 in the cutting. An end portion Ps of each opening 5a at the top side (on the lower side of FIG. 2) of the screw portion 3 is positioned corresponding to the second groove of the chamfer angle portion 3a. An end portion Pe of each opening 5a at the rear side (on the upper side of FIG. 2) of the screw portion 3 is positioned corresponding to the fifth groove of the complete thread portion 3b.

The end portion Ps of each opening 5a at the top side of the screw portion 3 is preferably positioned not only corresponding to the second groove of the chamfer angle portion 3a, but in the range of the chamfer angle portion 3a. In other words, when the end portion Ps of each opening 5a at the top side of the screw portion 3 positioned at the top of the screw portion 3, namely, when the intake hole 5 penetrates the screw portion 3, sufficient negative pressure cannot be obtained, and thus the aspiration force decreases in the intake. As a result, a chip aspiration capability decreases.

On the other hand, when the end portion Ps of each opening 5a at the top side of the screw portion 3 is not positioned in the range of the chamfer angle portion 3a, namely, is positioned at the complete thread portion 3b, the openings 5a cannot be established corresponding to the range of the chamfer angle portion 3a, and thus the chip aspiration capability decreases.

In contrast, the end portion Ps of each opening 5a at the top side of the screw portion 3 is positioned in the range of the chamfer angle portion 3a, so that the decrease of the aspiration force can be suppressed, and the chips generated at the chamfer angle portion 3a can be aspirated in the range of the chamfer angle portion 3a. Accordingly, the chip aspiration capability can be improved.

The end portion Pe of each opening 5a at the rear side of the screw portion 3 is preferably positioned not only corresponding to the fifth thread of the complete thread portion 3b, but closer to the top side of the screw portion 3 than to a position corresponding to the tenth thread of the complete thread portion 3b. In other words, when the end portion Pe of each opening 5a at the rear side of the screw portion 3 is positioned closer to the rear side of the screw portion 3 than to the position corresponding to the tenth thread of the complete thread portion 3b, an area of each opening 5a becomes large, and sufficient negative pressure is not obtained, thereby decreasing the aspiration force for the aspiration. As a result, the chip aspiration capability decreases.

In contrast, the end portion Pe of each opening 5a at the rear side of the screw portion 3 is positioned closer to the top side of the screw portion 3 than to the position corresponding to the tenth thread of the complete thread portion 3b, so that the decrease of the aspiration force can be suppressed, and thus the chip aspiration capability can be improved.

Additionally, because no chip is generated at the complete thread portion 3b, tool rigidity can be secured without decreasing the chip aspiration capability when the end portion Pe of each opening 5a at the rear side of the screw portion 3 is positioned closer to the top side of the screw portion 3 than to the position corresponding to the tenth thread of the complete thread portion 3b. As a result, the tool life can be increased.

Figure 3:
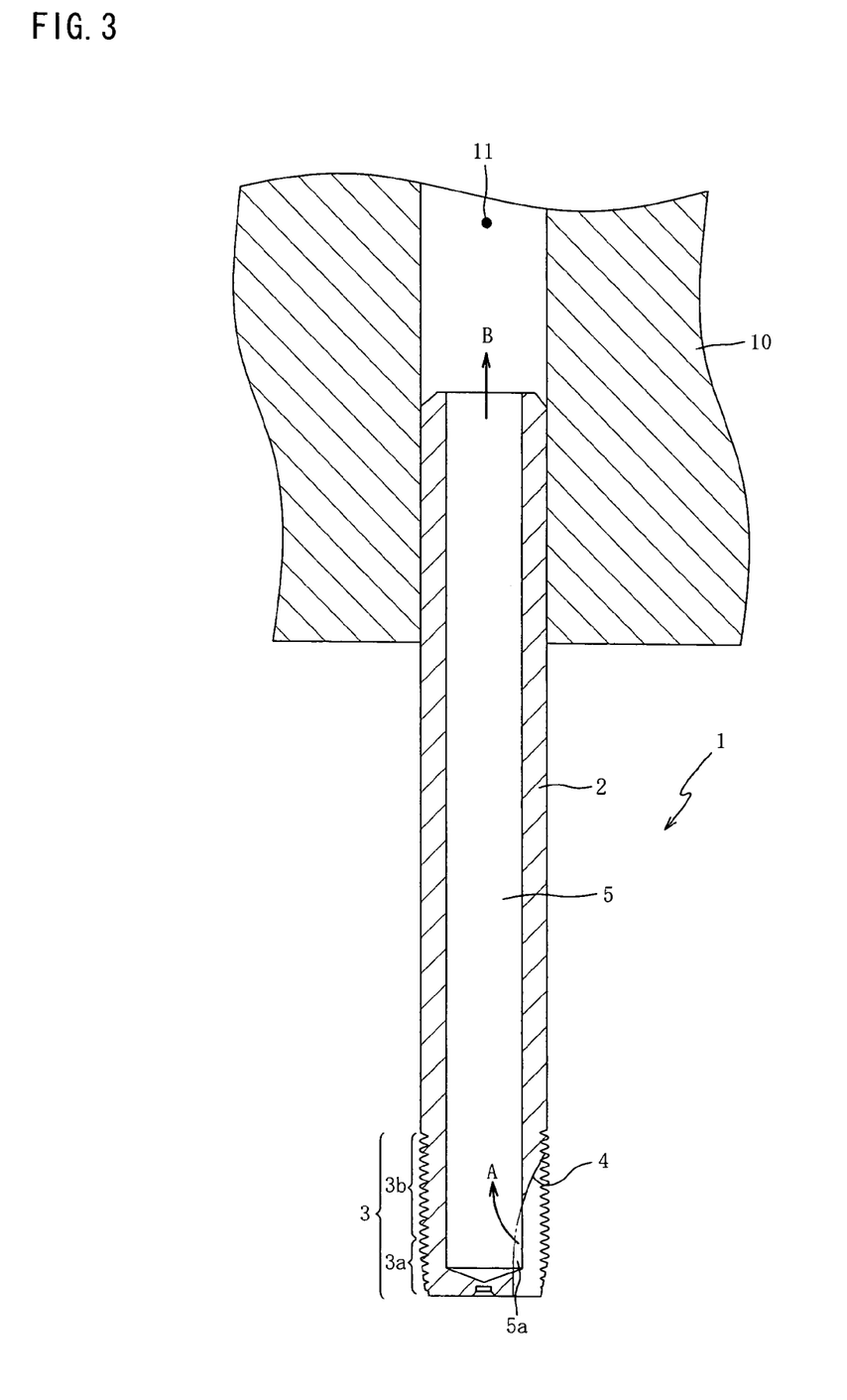
FIG. 3 is a cross sectional view of the tap held by a holder.

Next, a method for collecting chips by use of the tap 1 constituted as described above is explained in reference to FIG. 3. FIG. 3 is a cross section view of the tap 1 held by the holder 10. In FIG. 3, part of the holder 10 is omitted. Additionally, in FIG. 3, the moving direction of chips is schematically shown by arrows A and B.

As shown in FIG. 3, the body 2 is held by the holder 10, so that the tap 1 is mounted in a tooling machine (not shown). In cutting a female screw, air intake is performed in an internal space 11 formed in the holder 10 from a tooling machine by a pump (not shown). Accordingly, the air intake is performed in the tap 1 via the intake hole 5.

In this case, as described above, because the openings 5a which open outside the body 2 are provided to the intake hole 5, chips generated at the chamfer angle portion 3a can be aspirated forcibly from the openings 5a in the cutting, as shown by the arrow A.

The intake by the pump continues, so that, as shown by the arrow B, the chips aspirated from the openings 5a can be discharged via the intake hole 5.

Figure 4:
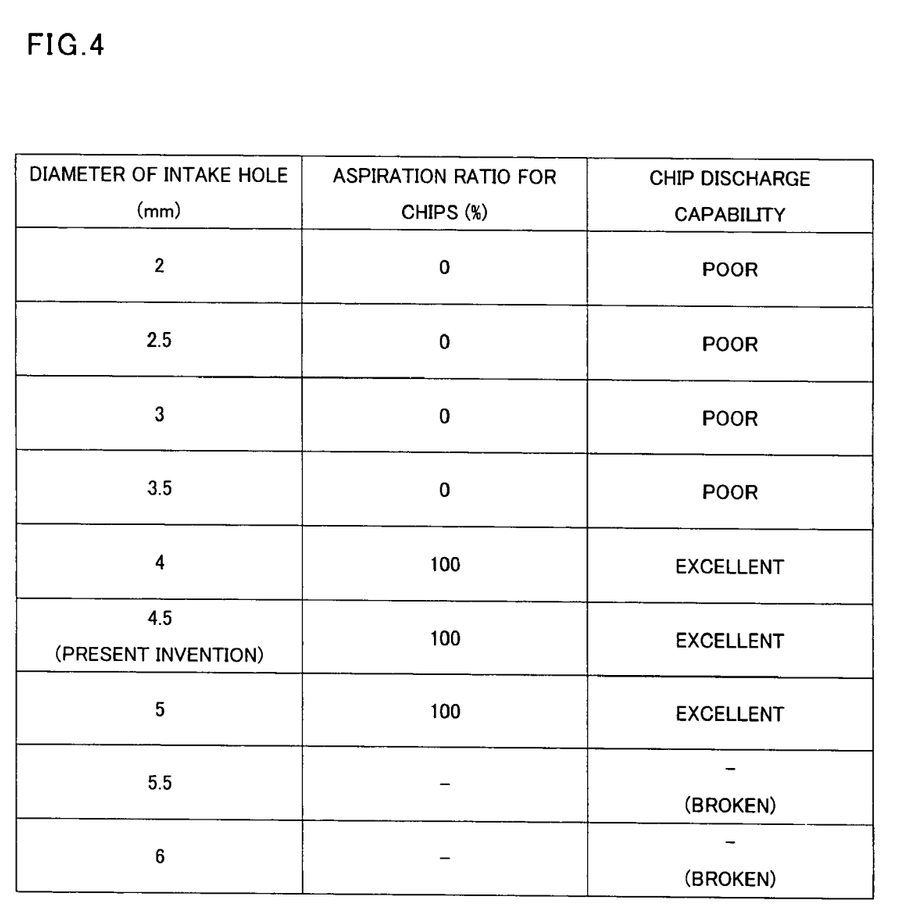
FIG. 4 is a table showing a result of an experiment of cutting.

Next, the experiment of the cutting using the tap 1 is explained in reference to FIG. 4. FIG. 4 shows the result of the experiment in the cutting.

The experiment of the cutting is such that, when the pilot hole of the work piece is cut by the tap 1 under a predetermined cutting condition, the capability of discharging chips generated in the cutting is experimented. In this experiment, from an aspiration ratio of chips (ratio between generated chips and aspirated chips), a quality of the discharge capability is determined.

The detailed data of the experiment of the cutting is as follows. The work piece is JIS-ADC12. The machine used is a vertical machining center. The cutting speed is 15 m/min. The diameter of the pilot hole is 6.8 mm. The machining depth is 20 mm.

In the experiment of the cutting, the tap 1 (hereinafter called "the present invention"), explained in this embodiment, and other taps in which the diameter Dh of the intake hole 5 had been changed in a predetermined range (from 2 mm to 6 mm), were used.

As shown in FIG. 4, from the result of the experiment of the cutting, when the present invention was used, the aspiration ratio for the chips was 100 percent, i.e., all the chips generated in the cutting were aspirated. Therefore, the discharge capability was excellent.

Similarly, when the diameter Dh of the intake hole 5 was 4 mm and 5 mm, the aspiration ratios ware 100 percent, i.e. all the chips generated in the cutting were aspirated. Therefore, the discharge capability was excellent.

Additionally, when the diameter Dh of the intake hole 5 was 2 mm, 2.5 mm, 3 mm, and 3.5 mm, all the aspiration ratios were zero percent, i.e., no chip generated in the cutting was aspirated. Therefore, the discharge capability was poor.

This can be considered to be caused by the fact that no chip was able to be aspirated because the openings 5a were unable to be provided to the intake hole 5 when the diameter Dh of the intake hole 5 was smaller than the groove bottom diameter Dg (=3.52 mm) of the grooves 4.

On the other hand, when the diameter Dh of the intake hole 5 was 5.5 mm and 6 mm, the tap was broken. This can be considered to be caused by the fact that the tool rigidity decreased because the wall thickness of the body 2 was thinned when the diameter Dh of the intake hole 5 was large relative to the diameter Db (=8 mm) of the body 2.

From this result, the diameter Dh of the intake hole 5 is preferably sixty-five percent or under of the diameter of the body 2. In other words, the diameter Dh of the intake hole 5 is over sixty-five percent of the diameter of the body 2, the wall thickness of the body 2 is thinned, and thus the tool rigidity decreases. In contrast, the diameter Dh of the intake hole 5 is sixty-five percent or under of the diameter of the body 2, so that the tool rigidity can be secured, and thus the tool life can be increased.

As described above, the tap 1 in the first embodiment includes the intake hole 5 having the openings 5a. Accordingly, the air intake is performed through the intake hole 5, so that the chips generated in the cutting can be aspirated from the openings 5a forcibly.

Therefore, because the chips can be discharged without using a cutting fluid, pollution of the environment can be prevented. Further, because the cutting fluid is not used, the machining cost can be reduced.

Further, because the chips can be aspirated from the openings 5a and discharged from the intake hole 5, the chips are not scattered on the work piece, and thus cleaning can be simplified.

Additionally, because the openings 5a open at the grooves 4, and the chips are aspirated from the openings 5a, containing spaces of the grooves 4 for containing the chips, for example, a length of the grooves 4, a width of the grooves 4, a depth of the groove bottoms of the grooves 4, or the like can be made small. As a result, the tool rigidity can be secured, so that the tool life can be increased.

Additionally, because the intake hole 5 extends from the rear end surface of the body 2, the constitution for discharging the chips can be simplified.

Further, because the grooves 4 extend from the top surface of the screw portion 3 to the position corresponding to the eleventh thread of the complete thread portion 3b, and thus extend in the range of the chamfer angle portion 3a, the chips generated at the chamfer angle portion 3a can be contained in the full range of the chamfer angle portion 3a. Accordingly, the chip containing capability can be improved, and thus the chip aspiration capability can be improved.

Further, because the extending length of the grooves 4 is shorter than the length corresponding to the range of the screw portion 3, the tool rigidity can be secured without decreasing the chip aspiration capability. As a result, the tool life can be increased.

The extending length of the grooves 4 from the end portion Pe of each opening 5a at the rear side of the screw portion 3 to the body 2 is preferably made by a length corresponding to the second thread or third thread of the complete thread portion 3b. Accordingly, both of the chip aspiration capability and the tool life can be improved.

Figure 5:
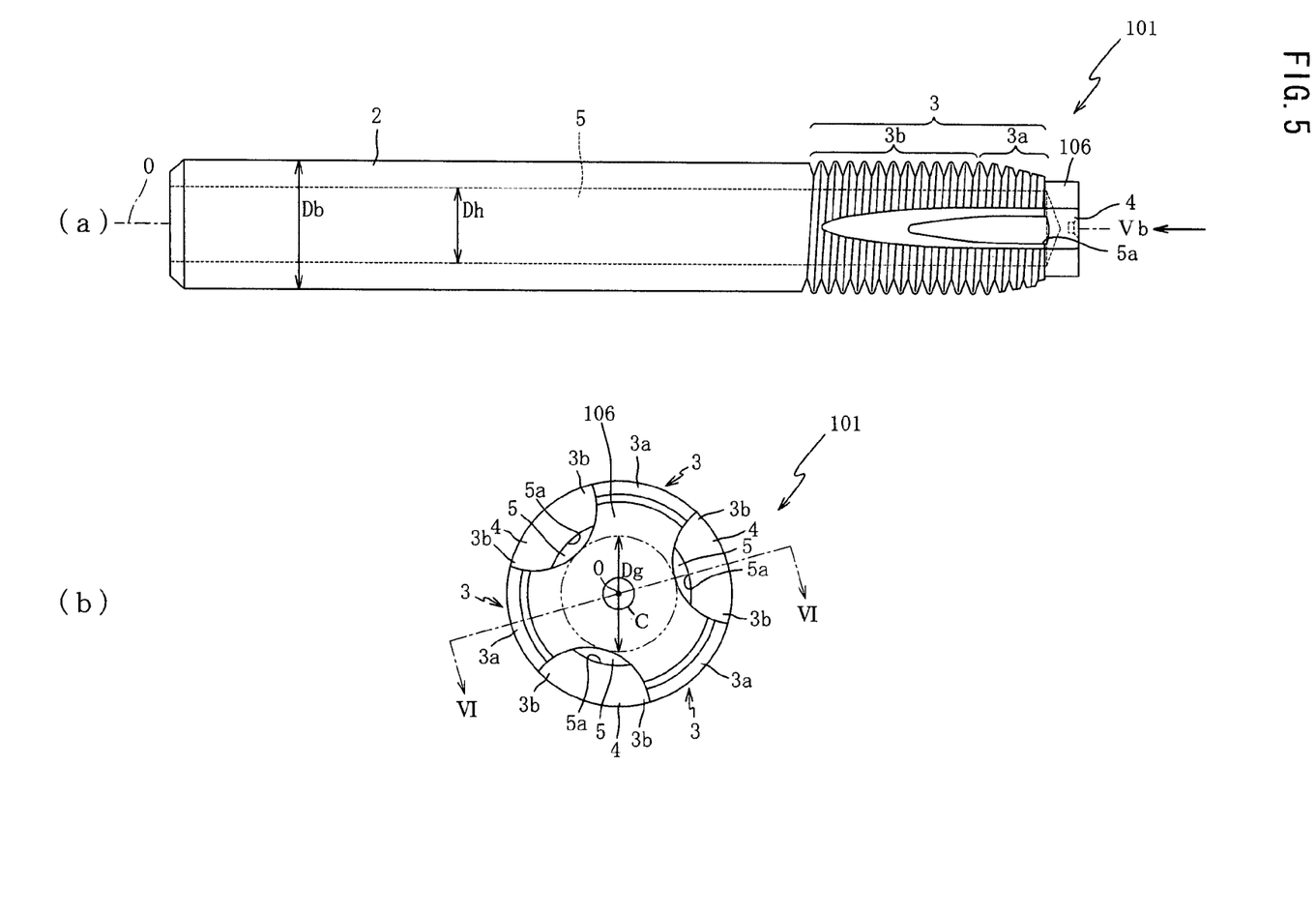
FIG. 5(a) is a front view of a tap in a second embodiment of the present invention.
FIG. 5(b) is a side view of the tap viewed from the direction of an arrow Vb of FIG. 5(a).

Next, in reference to FIG. 5, a tap 101 in a second embodiment is explained. FIG. 5(a) is a front view of the tap 101, and FIG. 5(b) is a side view of the tap 101 viewed from the direction of an arrow Vb of FIG. 5(a).

The first embodiment has been explained for the case where the end portion Ps of each opening 5a at the top side of the screw portion 3 is positioned at the second thread of the chamfer angle portion 3a in the tap 1. The tap 101 in the second embodiment includes a projection 106 on the top surface of the screw portion 3. The end portion Ps of each opening 5a is positioned at the projection 106. The same parts as the first embodiment are provided with the same symbols, and the explanation of the same parts is omitted.

As shown in FIG. 5, the tap 101 includes the projection 106 on the top surface (the right side of FIG. 5(a)) of the screw portion 3. A center hole C formed about the axis O is shown in FIG. 5(b) on an end surface of the projection 106, which is more clearly shown in FIG. 6. As is well known in the art, the center hole C is formed on an end of the tap for supporting the tap by tools during a machining process. As shown in FIG. 5, the projection 106 is formed to be a cylindrical shape having a smaller diameter than the diameter Db of the body 2, and provided concentrically with the center axis O of the body 2. As shown in FIG. 5, the grooves 4 extend to the projection 106.

As shown in FIG. 5, the intake hole 5 extends from the rear end surface (the left side of FIG. 5(a)) of the body 2 substantially to the center portion of the projection 106 along the center axis O of the body 2 until close to the center hole C. Accordingly, as shown in FIG. 5, the openings 5a are provided to the grooves 4.

Figure 6:
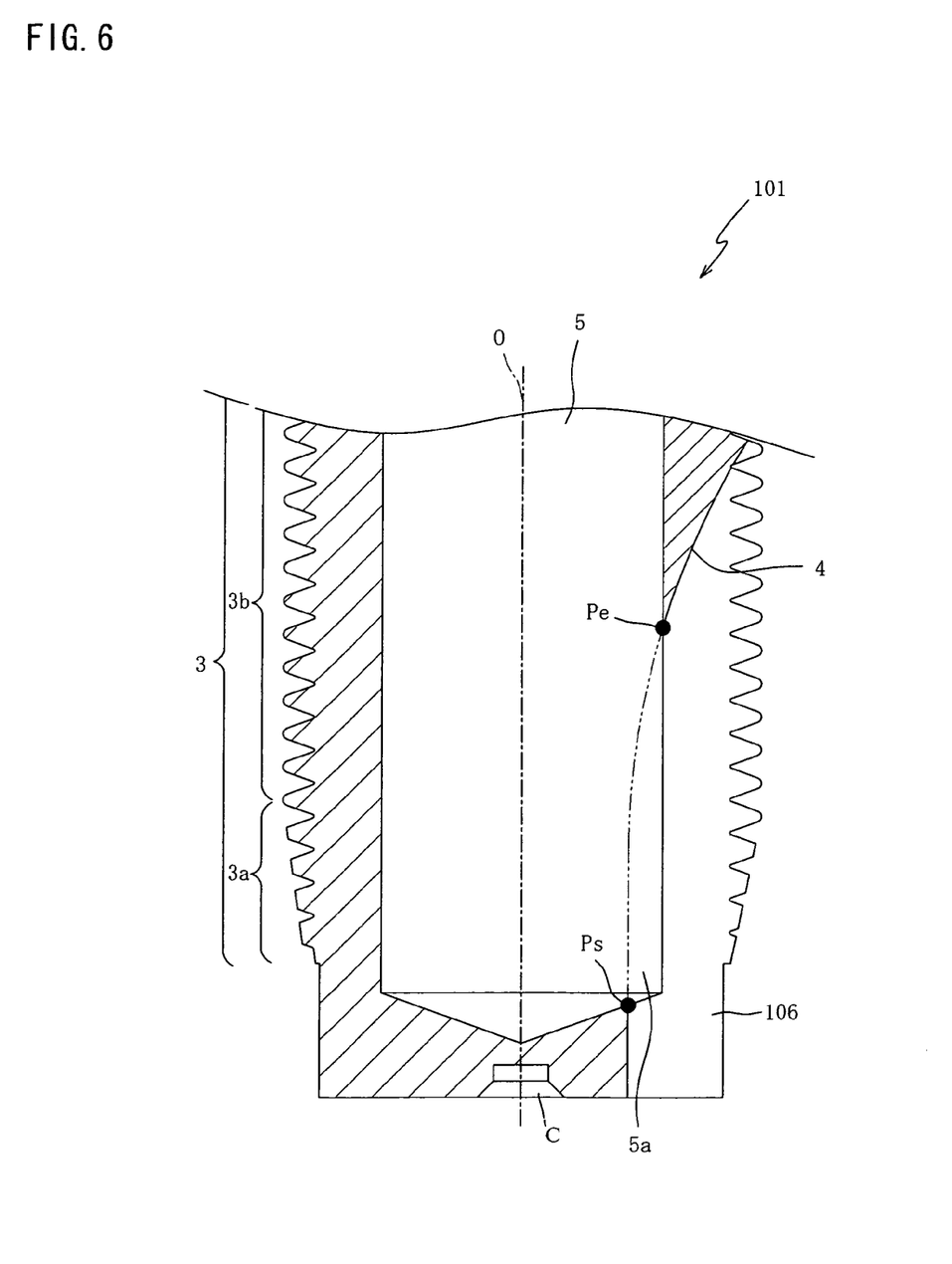
FIG. 6 is a cross sectional view of the tap taken along a line VI-VI of FIG. 5(b).

In reference to FIG. 6, the detailed constitution of each opening 5a is explained. FIG. 6 is a cross section view of the tap 101 taken along the line VI-VI of FIG. 5(b). In FIG. 6, the length in the direction of the center axis O of the body 2 is omitted.

As shown in FIG. 6, each opening 5a is so constituted that the end portion Ps on the top side (lower side of FIG. 6) of the screw portion 3 is positioned substantially at the center portion of the projection 106, and the end portion Pe on the rear side (upper side of FIG. 6) of the screw portion 3 is positioned corresponding to the fifth thread of the complete thread portion 3b.

The end portion Ps of each opening 5a at the top side of the screw portion 3 is preferably positioned not only substantially at the center portion of the projection 106 but at the projection 106. In other words, when the end portion Ps of each opening 5a at the top side of the screw portion 3 is not positioned at the projection 106, but is positioned at the screw portion 3, the openings 5a cannot be established corresponding to the full range of the chamfer angle portion 3a, thereby decreasing the chip aspiration capability.

In contrast, the end portion Ps of each opening 5a at the top side of the screw portion 3 is positioned at the projection 106, so that the chips generated at the chamfer angle portion 3a can be aspirated in the full range of the chamfer angle portion 3a, and thus the chip aspiration capability can be improved.

As described above, because the tap 101 in the second embodiment includes the projection 106, the intake hole 5 can extend over the top of the screw portion 3 without the penetration of the intake hole 5 (i.e., until close to but not reaching the center hole C) as shown in FIGS. 5 and 6. Additionally, because the intake hole 5 extends over the top of the screw portion 3, the openings 5a can be provided corresponding to the full range of the chamfer angle portion 3a.

Accordingly, the chips generated at the chamfer angle portion 3a can be aspirated in the full range of the chamfer angle portion 3a, so that the chip aspiration capability can be improved.

The present invention has been explained above in accordance with the embodiments. The present invention is not limited to the above embodiments, and it can be easily guessed that various modifications are possible within the scope of the present invention.

For example, in the above embodiments, the so-called straight groove tap in which the grooves 4 recessed substantially parallel to the center axis O of the body 2 has been explained. Not only this, but also, for example, a spiral tap or a point tap may be constituted.

The case where the three grooves 4 are provided, has been explained in the above embodiments, but the present invention is not limited to the case. For example, one or two, or four or more grooves 4 may be provided. The three grooves 4 are preferably provided because the chip aspiration capability decreases when the one or two grooves 4 are provided, and because the tool rigidity decreases when the four or more grooves 4 are provided.

In the above embodiments, the case where the chamfer angle portion 3a and the complete thread portion 3b are integrally formed at the screw portion 3, has been explained, but the present invention is not limited to this case. The chamfer angle portion 3a and the complete thread portion 3b can be constituted detachably to the screw portion 3. In this case, the tool life can be increased by exchanging the chamfer angle portion 3a and the complete thread portion 3b.

The invention claimed is:

1. A tap for cutting a female screw on a work piece by rotating about a center axis, comprising:
    a screw portion having a chamfer angle portion and a complete thread portion provided next to the chamfer angle portion,
    a body provided next to the screw portion,
    a groove recessed on an outer peripheral surface of the screw portion,
    a projection having a cylindrical shape and integrally formed with the screw portion in a manner extended from a top surface of the screw portion;
    a center hole recessed on an outer end surface of the projection about the center axis; and
    an intake hole extending inside the body from a rear end surface of the body and through an inside of both the screw portion and the projection in such a way that it extends over the top surface of the screw portion until close to but not reaching the center hole,
    wherein the intake hole has a circular cross section with a diameter smaller than a diameter of the body and larger than a groove bottom diameter of the groove, and has an opening which opens to an outside at the groove;
    wherein a first end portion of the opening of the intake hole at a top side of the screw portion is positioned at the projection while a second end portion of the opening opposite to the first end portion is positioned at about a middle area of the screw portion; and
    wherein chips generated in cutting are aspirated from the opening by performing air intake through the intake hole.

2. The tap according to claim 1, wherein the diameter of the intake hole is equal to or smaller than sixty-five percent of the diameter of the body.

3. The tap according to claim 1, wherein the first end portion of the opening is positioned at the projection, and the second end portion of the opening is positioned closer to the top side of the screw portion than to a position corresponding to a tenth thread of the complete thread portion.

4. The tap according to claim 1, wherein the groove extends at least into a range of the chamfer angle portion, and an extending length of the groove is shorter than a length corresponding to the range of the screw portion.

* * * * *